United States Patent [19]

Roberts

[11] 4,255,086

[45] Mar. 10, 1981

[54] LOCKING DEVICE FOR BLADE MOUNTING

[75] Inventor: Ivor J. Roberts, St. Lambert, Canada

[73] Assignee: Pratt & Whitney Aircraft of Canada Limited, Longueuil, Canada

[21] Appl. No.: 58,426

[22] Filed: Jul. 18, 1979

[30] Foreign Application Priority Data

Jun. 27, 1979 [CA] Canada .................................. 330729

[51] Int. Cl.³ ........................... F03B 3/16; F03B 3/12
[52] U.S. Cl. .................................. 416/218; 29/156.8 R
[58] Field of Search ............................... 416/415–418; 29/156.8 R

[56] References Cited

U.S. PATENT DOCUMENTS

| 991,296 | 5/1911 | Haines | 416/218 |
|---|---|---|---|
| 3,088,708 | 5/1963 | Feinberg | 416/215 |
| 3,252,687 | 5/1966 | Beck et al. | 416/218 |
| 3,383,094 | 5/1968 | Diggs | 416/215 |
| 3,597,112 | 8/1971 | Garten | 416/215 |
| 3,721,506 | 3/1973 | Anderson | 416/215 |
| 3,881,844 | 5/1975 | Hennessey et al. | 416/218 |
| 3,902,824 | 9/1975 | Sauer | 416/215 |
| 3,955,898 | 5/1976 | Zaehring | 416/215 |

Primary Examiner—William L. Freeh
Attorney, Agent, or Firm—Fleit & Jacobson

[57] ABSTRACT

A rotor assembly including a spool and a plurality of radially extending rotor blades mounted in a groove provided circumferentially of the spool is described. The groove includes a pair of inwardly extending flanges which define a throat area narrower than the groove. A stacking hole extends radially and communicates with the groove to allow the rotor blade members to be individually mounted to the spool. The locking device for retaining the rotor blades in the spool includes a C-shaped spring adapted to urge against the roots of each rotor blade in the groove and a locking protrusion adapted to engage in the stacking hole and in an opening formed in the platforms of two adjacent blades straddling the stacking hole whereby the locking device abuts against the ends of the flanges in the stacking hole and retains the rotor blades against circumferential movement. A pair of anchor members can also be provided near the ends of the C-shaped spring member for engagement in the root of pairs of blades.

6 Claims, 9 Drawing Figures

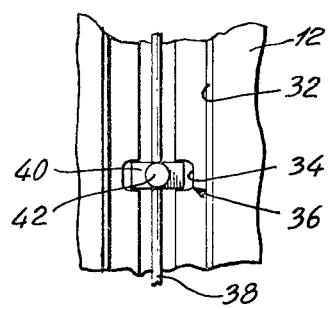
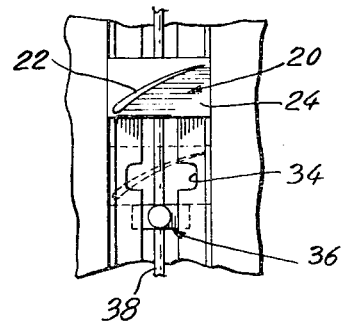
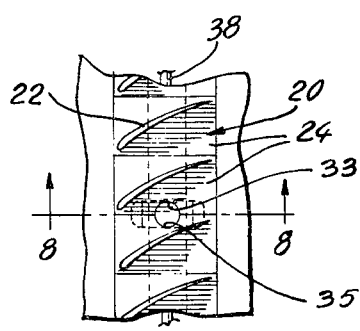
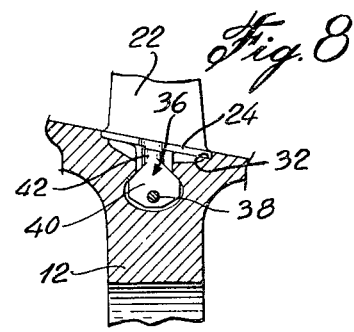
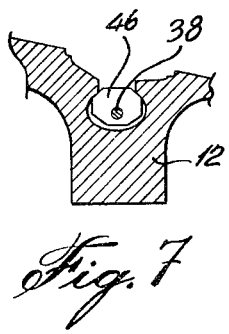
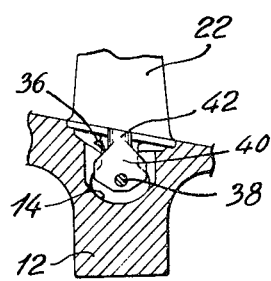

LOCKING DEVICE FOR BLADE MOUNTING

BACKGROUND OF THE INVENTION

1. Field of the Invention

The present invention relates to turbines and particularly to a locking device for locking rotor blades circumferentially to a rotor.

2. Description of the Prior Art

It is well known in the prior art to mount rotor blades in a circumferential groove provided on the spool or rotor disc of a compressor or turbine rotor in a gas turbine engine. The groove includes a relatively narrow throat defined by inwardly extending flanges. The blades have hammerhead-shaped roots adapted to slide in the grooves and be retained against centrifugal force by the flanges. A stacking hole is provided extending radially through the flanges and communicates with the groove. The stacking hole is large enough to accommodate the hammerhead-shaped root portion of the rotor blade. The problem is to lock the rotor blades in the groove, considering the stacking hole, in a manner to retain the blades against circumferential movement which can be caused by the tangential component of force when the rotor is turning at high speeds.

Such a locking device is illustrated in U.S. Pat. No. 3,088,708, Feinberg, May 7, 1963, which shows the use of a block in combination with a set screw, which set screw bears against the bottom of the groove while maintaining the block in an upward position locked against the platforms of the blade and the flanges or shoulders defining the throat of the slot.

Another locking device is illustrated in U.S. Pat. No. 3,597,112, Garten, Aug. 3, 1971. In the Garten patent, a spring retaining slot is provided, subsidiary to the circumferential root receiving slot. The ends of a leaf spring engage the ends of the spring retaining slot, and a protuberance engages between the root members of a pair of blades straddling the stacking hole.

U.S. Pat. No. 3,955,898, Zaehring, May 11, 1976, shows a spring operated locking device having a swivel portion adapted to be rotated once it is in the slot to register with the stacking hole.

All of these locking devices are believed to work satisfactorily with relatively large engines. However, they become impractical when applied to very small gas turbine engines, such as the Pratt & Whitney PT6 type, where the compressor rotor may be the order of 5 inches in diameter.

When assembling such small rotors, it is not practical to utilize coil springs or set screws as the present above-mentioned locking devices.

SUMMARY OF THE INVENTION

It is an aim of the present invention to provide a locking assembly for a rotor which is simple in construction and can be readily applied to a rotor of small dimensions.

It is a further aim of the present invention to provide a locking system which results in easier assembly and disassembly of the rotor blades on the spool.

A construction in accordance with the present invention comprises a rotor assembly including a spool having a circumferential groove and a pair of inwardly extending flanges defining a throat narrower than the groove and providing a pair of continuous shoulder receiving seats co-extensive with the groove, a radially defined stacking hole communicating with said groove, a plurality of rotor blade members each having a root portion including a pair of shoulders adapted to mate with the shoulder receiving seats, the stacking hole being such as to allow the root of each blade to pass therethrough, said root portions only partially filling said slot in cross-section and each root portion including a spring receiving seat having an axis extending in the circumferential direction when mounted in the groove, each blade member including a platform member spaced radially from the root and adapted to be seated on the exterior of said flanges, at least two of the blade platforms each defining a complemental opening such that when all of the blade members are assembled on the spool, the two blades having platforms defining complemental openings are arranged to provide an opening aligned radially with said stacking hole, and a locking member including a spring member in the form of a segment of a circle being adapted to, when installed in the groove, press radially outwardly against the spring seats provided on the roots, and a locking protrusion provided on the spring member adapted to fit and be located in the opening provided in the two platforms and aligned with the stacking hole.

A method of locking rotor blades in a rotor assembly for a turbine in accordance with the present invention includes the steps of providing a circumferential groove with throat forming flanges in a spool, forming a stacking hole extending radially from the groove for loading the rotor blades, loading a predetermined set of rotor blades into the groove, loading the spring member shaped as a segment of a circle with a locking protrusion centrally thereof, an anchor member near each end thereof and engaging against the loaded set of blades, placing the protrusion to one side of the stacking hole and loading a second predetermined set of blades to the other side of the stacking hole with the last blade defining in its platform a partial opening, moving the locking protrusion to the other side of the stacking hole and loading a third and final set of blades to the one side of the stacking hole with the last blade having a complementary partial opening in its platform, rearranging the rotors such that the two blade members defining the opening straddle the stacking hole and the locking protrusion is in position within the opening and abuts against the flanges on either side of the stacking hole.

BRIEF DESCRIPTION OF THE DRAWINGS

Having thus generally described the nature of the invention, reference will now be made to the accompanying drawings, showing by way of illustration, a preferred embodiment thereof, and in which:

FIG. 4 is a fragmentary top plan view of a detail of the spool prior to the loading of the rotor blades;

FIG. 5 is a top plan view similar to FIG. 4 showing the rotor blades being loaded;

FIG. 6 is a top plan view similar to FIGS. 4 and 5 and showing all of the rotor blades loaded and the locking device in place;

FIG. 7 is a fragmentary cross-sectional view taken along line 7—7 of FIG. 1;

FIG. 8 is a vertical cross-section taken along line 8—8 of FIG. 6, showing the locking protrusion in a locked position; and FIG. 9 is a similar cross-section taken along line 8—8 of FIG. 6, showing the protrusion in the locked position.

DESCRIPTION OF THE PREFERRED EMBODIMENTS

Figure 1:
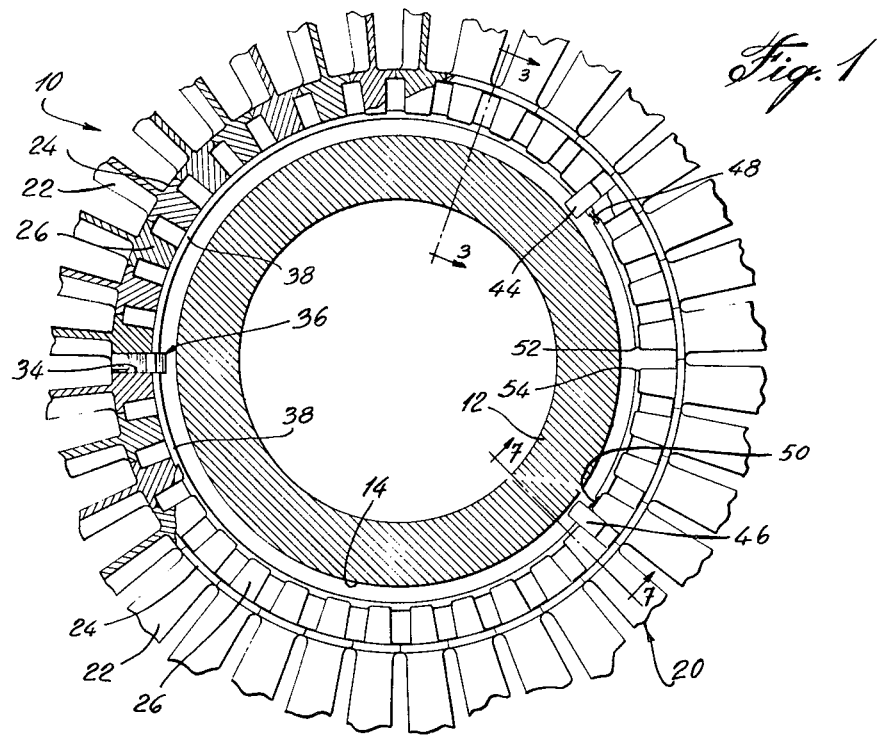
FIG. 1 is a transverse radial cross-section taken through a typical spool and showing, partially in cross-section, a plurality of rotor blades locked in place on the spool.

Referring now to the drawings, there is shown a rotor 10 which includes a spool 12. A plurality of rotor blades 20 are provided with the roots 26 locked in a groove 14 circumscribing the spool 12. The rotor blades 20 are being locked in place on the spool by means of a locking device 36.

Figure 2:
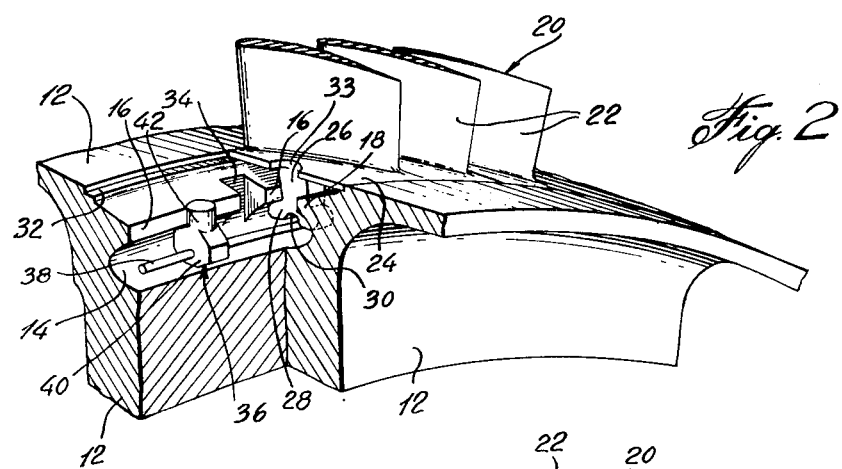
FIG. 2 is an enlarged perspective view of a detail of FIG. 1.
Figure 3:
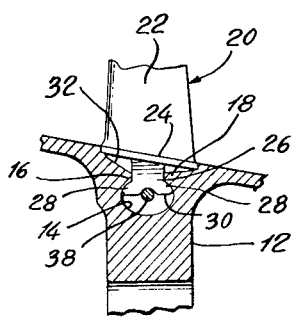
FIG. 3 is a fragmentary axial cross-section taken along line 3—3 of FIG. 1.

As shown in FIGS. 1, 2 and 3, the spool 12 includes a groove 14 having flanges 16 and 18 defining a throat area narrower than the groove 14. The groove 14 in the present case has a somewhat rounded cross-section resembling an oval and terminating at the ends of the flanges 16 and 18. The flanges 16 and 18 are interrupted at the location of the stacking hole 34. The stacking hole is of a dimension sufficient to allow the root 26 of the blades 20 to pass therethrough.

Each of the rotor blades 20 includes a blade 22, fixed to a platform 24. The platform 24, in this case, is of rectangular outline and sits in the continuous recess 32 on the spool 12. A root 26 is provided on the bottom of the platform 24. Each root 26 includes shoulders 28 which are adapted to conform to the profile of the shoulder receiving seats formed by the flanges 16 and 18 in the groove 14. The root 26 also includes a semi-cylindrical seat at the bottom thereof adapted to receive the spring 38 as will be described later. The axis of the seat is in the circumferential direction. The root 26 does not completely fill the cross-section of the groove 14 in order to allow easier sliding and positioning of the blades 20 during assembly or dis-assembly of the rotor assembly 10.

The locking device 36 is slidable on a C-spring 38 which is in the form of a wire forming a segment of a circle. In the present case, the segment is almost a complete circle and is, in effect, a split ring. The locking device 36 includes a carriage 40 mounted to C-spring 38. A cylindrical protrusion 42 is provided on the carriage 40. The C-spring 38 is pinched at 48 and 50 near the ends 52 and 54 thereof. Anchor plates 44 and 46 are provided for sliding movement on the C-spring 38 but are limited by the pinched portions 48 and 50 respectively. An anchor plate 46 is as shown in FIG. 7 of the drawings.

Two of the rotor blades 20 are provided along the edge of their platforms 24 with respective half circle openings 33 and 35 respectively. When the two terminal rotor blades 20 straddle the stacking hole 34 as will be described, the half circles 33 and 35 form a circular opening adapted to receive the protrusion 42.

A typical rotor assembly 10 is assembled as follows. Approximately eight rotor blades are arranged on the spool by passing the roots 26 of each rotor blade 20 through the stacking hole 34 and locating the eight rotor blades in a sector of the spool opposite the stacking hole 34. The C-spring 38 is then located in the groove with the ends 52 and 54 of the spring member 38 abutting against the spring seats 30 of each root of a respective blade while the anchor plates 44 and 46 are moved to abut against the sides of the end blades of the eight blades located.

The locking device 36, including the carriage 40 and protrusion 42, is passed through the stacking hole 34 and is moved to one side of the stacking hole 34. A plurality of blades 20, approximately fourteen in all, are then passed through the stacking hole one by one and moved to the other side of the stacking hole such as to fill the second sector of blades. The root 26 of each blade is pressed centrifugally by the spring 38 resting against the spring seat 30 of each root 26.

The final rotor blade of this group of blades is one of the rotor blades including a half circular opening 33 in the platform 24 thereof. The blades 20 are then moved slightly so that the final rotor blade 20 clears the stacking hole to allow the carriage 40 with protrusion 42 to be passed by the stacking hole 34 to the other side thereof so as to allow a final group of rotor blades to be mounted one by one through the stacking hole 34. The final rotor blade 20 of the third and last group of rotor blades includes a half circle 35, and once it is entered, will abut against the rotor blade 20 including the half circle aperture 33. The rotor blades are then slightly rearranged such that the two final rotor blades, that is, the platforms thereof, straddle the stacking hole 34 as shown in FIG. 6, and the protrusion 42 which should now be immediately underneath the circular aperture 33, 35, is allowed to spring upwardly such that the cylindrical protrusion 42 passes into the opening 33, 35, flush with the top platform 24 of the respective rotor blades. Thus, since the carriage 40 is moved upwardly in the stacking hole, it abuts against the ends of the flanges 16 and 18, and since the protrusion passes upwardly through the aperture 33, 35, it locks the rotor blades 20 from circumferential movement. The spring 38 urges against the roots and the locking device 36 in the centrifugal direction.

I claim:

1. A rotor assembly comprising a spool, a circumferential groove defined in the spool and including a pair of inwardly extending flanges defining a throat narrower than the groove and providing a pair of continuous shoulder receiving seats co-extensive with the groove, a radially defined stacking hole communicating with said groove, a plurality of rotor blade members each having a root portion including a pair of shoulders adapted to mate with the shoulder receiving seats, the stacking hole being such as to allow the root of each blade to pass therethrough, said root portion only partially filling said groove in axial cross-section, and each root portion including a spring receiving seat having an axis extending in the circumferential direction when mounted in the groove, each blade member including a platform member spaced radially from the root and adapted to be seated on the exterior of the flanges, at least two of the blade platforms each defining a complemental opening such that when all of the blade members are assembled on the spool, the two blades having platforms defining complemental openings are arranged to provide an opening aligned radially with the stacking hole, and a locking member including a spring member in the form of a segment of a circle being adapted to, when installed in the groove, press radially outwardly against the spring seats provided on the roots and a locking protrusion provided on the spring member adapted to fit and be located in the opening provided in the two platforms and aligned with the stacking hole.

2. A rotor assembly as defined in claim 1, wherein the locking protrusion includes a carriage portion slidably arranged on the spring member having a portion enlarged relative to the protrusion portion engaging the ends of the flanges at the stacking hole, and the protrusion adapted to be seated in the complemental openings between two adjacent blades straddling the stacking hole such that the rotor blades are held against circumferential movement by said protrusion and carriage member.

3. A rotor assembly as defined in claim 1, wherein the spring member is in the form of a split ring and includes a pair of anchor plates slidable on the split ring and limited against movement off the ends of the ring and adapted to engage between selected pairs of roots of adjacent blades, the split ring urging the locking member including the protrusion centrifugally outwardly as well as urging the roots of the so-engaged blades outwardly.

4. A rotor assembly as defined in claim 1, wherein the complemental openings defined in the platforms of adjacent rotor blades straddling the stacking hole are semicircular in outline defining a circular opening adapted to receive a cylindrical shaped protrusion.

5. A rotor assembly as defined in claim 1, wherein each root includes a cross-sectional area less than one half the cross-sectional area of the groove and a rounded semi-cylindrical seat portion centrally of two legs forming the root and the seat portion adapted to receive the split ring-shaped spring member.

6. A method of locking rotor blades in a rotor assembly for a turbine, including the steps of providing a circumferential groove with throat forming flanges in a spool, forming a stacking hole extending radially from the groove for loading the rotor blades, loading a predetermined set of rotor blades into the groove, loading the spring member shaped as a segment of a circle with a locking protrusion centrally thereof, and an anchor member near each end thereof and engaging against the loaded set of blades, placing the protrusion to one side of the stacking hole and loading a second predetermined set of blades to the other side of the stacking hole with the last blade defining in its platform a partial opening, moving the locking protrusion to the other side of the stacking hole and loading a third and final set of blades to the one side of the stacking hole with the last blade having a complementary partial opening in its platform, rearranging the rotors such that the two blade members defining the opening straddle the stacking hole and the locking protrusion is in position within the opening and abuts against the flanges on either side of the stacking hole.

* * * * *